US005192178A

United States Patent [19]

Silbernagel

[11] Patent Number: 5,192,178

[45] Date of Patent: Mar. 9, 1993

[54] EXTENSIBLE DISCHARGE CHUTE ASSEMBLY

[76] Inventor: Frederick J. Silbernagel, 4007 Fontana Dr., Oklahoma City, Okla. 73116

[21] Appl. No.: 694,751

[22] Filed: May 2, 1991

[51] Int. Cl.$^5$ .................... B65G 11/12

[52] U.S. Cl. .................... 414/523; 414/476; 414/507; 193/10; 193/16; 298/7; 366/68; 280/704; 280/711

[58] Field of Search .................... 193/2 R, 4, 5, 6, 15, 193/10, 16, 23, 25 C, 30; 298/7; 414/476, 501, 474, 537, 523; 366/68; 280/840, 704, 711

[56] References Cited

U.S. PATENT DOCUMENTS

| | | | |
|---|---|---|---|
| 137,371 | 4/1873 | Iske . | |
| 165,632 | 7/1875 | Thompson . | |
| 173,629 | 2/1876 | High et al. . | |
| D. 181,998 | 1/1958 | Prichard | D14/3 |
| D. 291,547 | 8/1987 | Silbernagel | D12/95 |
| 801,252 | 10/1905 | Koller . | |
| 1,031,829 | 7/1912 | Adams . | |
| 1,364,581 | 1/1921 | Ramsey . | |
| 1,401,837 | 12/1921 | Vogt . | |
| 1,718,460 | 6/1929 | Hansen et al. | 193/16 |
| 2,439,961 | 4/1948 | Bauders | 193/3 |
| 2,713,929 | 7/1955 | Castendyck | 193/10 |
| 2,957,593 | 10/1960 | Evans | 414/476 |
| 2,968,382 | 1/1961 | Oury | 193/10 |
| 3,019,002 | 1/1962 | Prichard . | |
| 3,112,100 | 11/1963 | Prichard . | |
| 3,157,262 | 11/1964 | Chapdelaine | 193/10 |
| 3,246,884 | 4/1966 | Prichard et al. . | |
| 3,498,435 | 3/1970 | Telefson | 193/4 |
| 4,047,604 | 9/1977 | Daoust et al. | 193/16 X |
| 4,290,733 | 9/1981 | Lahman | 414/476 |
| 4,314,709 | 2/1982 | Silbernagel | 280/81 A |
| 4,498,568 | 2/1985 | Christenson | 193/10 |
| 4,619,578 | 10/1986 | Routledge | 414/476 X |
| 4,711,334 | 12/1987 | Barry et al. | 193/6 |

*Primary Examiner*—Frank E. Werner
*Attorney, Agent, or Firm*—Kinney & Lange

[57] ABSTRACT

A cement mixer truck that has an extendable chute assembly that permits extending one, two or more chute sections for discharge of concrete at a location remote from the mixer. The chute section is easily telescopic, can be locked in either the retracted or extended positions, and can be swiveled about a vertical axis. Further, for storage, the chutes will fold up automatically when at a proper position to engage an actuator to cause the chutes to fold. The truck shown is a front discharge mixer truck that can be adjusted in vertical height at a job site to permit a greater slope to the chutes and is available with a restricted height truck.

20 Claims, 13 Drawing Sheets

EXTENSIBLE DISCHARGE CHUTE ASSEMBLY

BACKGROUND OF THE INVENTION

The present invention relates to discharge chute assemblies and, in particular, telescopic discharge chute assemblies for concrete mixer trucks.

In many industrial, agricultural and construction operations it is desired to deposit various materials stored or contained in a discharge apparatus to preselected deposit points radially surrounding the discharge apparatus. An example of one such operation includes depositing concrete mix from a concrete mixer vehicle with a chute assembly mounted at a discharge or mixer opening.

Commonly, these concrete mixer vehicles include a main chute section of the discharge chute assembly that is mounted permanently and pivotally to the mixer vehicle. The main chute is mounted with its upper end beneath the mixer discharge opening and its lower end supported by an extendible hydraulic piston and cylinder mechanism that permits selective angles of inclination of the discharge chute assembly. A second chute section is pivotally connected to the lower end of the main chute section thereby allowing the second chute section to fold from an operational position where the second chute acts as an extension of the main chute to a storage position folded on top of the main chute section. Additional chute sections can be attached in series to a lower end of the second chute section to provide a chute assembly having desired length. These additional chute sections usually are detachable and are stored on a portion of the vehicle frame, and normally have hook means on each section for interconnecting these sections to form the complete discharge chute assembly. Although such detachable chute assemblies allow the discharge of concrete mix to preselected deposit points, the requirement of manually connecting and disconnecting detachable chute sections is a time consuming exercise.

Other known discharge chute assemblies incorporate permanently connected telescoping chute sections rather than using additional detachable chute sections. Two known telescoping chute assemblies are disclosed in U.S. Pat. No. 3,157,262 to Chapdelelaine and U.S. Pat. No. 4,711,334 to Barry et al. U.S. Pat. No. 3,157,262 discloses a telescopic chute assembly that has chute sections that retract into a main chute section located beneath the mixer opening. U.S. Pat. No. 4,711,334 teaches a telescoping chute assembly with the telescoping sections forming a compact assembly that is hinged for storage above a main chute section. While both telescopic chute assemblies described above reduce the time needed to set up and deliver concrete mix to a particular site, permanent connection of each chute section prevents convenient operation when a shorter, less bulky chute assembly is needed. The extension of the chutes also is difficult in its pin devices.

Finally, it is often desirable to locate the discharge chute assembly, in particular an inlet end of a main chute section, at an elevation as high as possible to allow for longer extension of the chute assembly. However, constraints such as the requirement that the chute assembly and discharge vehicle have a low enough profile to pass under bridges must be considered.

Thus, there is a continuing need for improved extendable chute assemblies to be used with discharge apparatus such as concrete mixer vehicles and which have an adjustable overall height.

SUMMARY OF THE INVENTION

The present invention relates to a front discharge concrete mixer truck. It has a multi-section discharge chute assembly mounted for receiving concrete from the mixer and directing it toward selected locations. The mixer truck is made so that the extendable chute assembly can be effectively used after extension by raising the height of the discharge end of the mixer, and thus the inlet end of the chute assembly through the use of air bag supports and at the same time providing a multi-sectioned, readily extendable and collapsible chute assembly that permits a discharge point located a substantial distance from the vehicle without the need to manually assemble and disassemble the chute sections each time concrete is to be discharged.

The raising of the discharge end of the mixer is accomplished by providing air bags between the supporting front axle of the vehicle and the main frame of the vehicle which in normal travel are deflated. When deflated, the bags form springs; however, if desired, actual mechanical springs can be utilized in the deflated position. The lower height cf the truck makes the truck capable of being operated under bridges and the like at standard clearance height, and when on a job site, by utilizing the normal air under pressure that is provided for large trucks, and inflating the air bags, the height of the truck can be raised substantially to permit gravity flow of concrete over longer distances through an attached extendable chute assembly. In the preferred embodiment, the extendable chute provides a series of trough sections, including a main section that is mounted on the discharge end of the mixer and which is capable of being swiveled across a wide range of lateral movement. The main chute section is supported at its outer end through the use of an extendable and retractable hydraulic cylinder, so the angle of inclination of the chute assembly can be changed. Subsequent, manually removable sections are placed onto the main section and these sections are open topped troughs which are sized so that they will nest and telescope or slide together on a second section that is attached to the main section. Third and fourth sections of the extendable chute telescope and fit outside the second section with the fourth section being the outer most section, and the shortest in length, so that it is on the outside when all the sections telescope.

Suitable latches are provided holding the sections in their working positions, and yet permit removal of sections quite easily when desired. Additional, latches are provided for holding the sections in a retracted position.

An actuator for storage of this chute section is provided so that upon extension of a hydraulic cylinder supporting the main section the actuator will engage a fixed reaction member on the truck frame and cause pivoting of the telescoped second, third, and fourth sections, into a generally upright, folded storage position.

The assembly provides for a compact, and very handy arrangement for discharging concrete from any form of mixer, particularly, a front discharge mixer truck.

The telescoping chute assembly, is of course, adaptable, and easily used with rear discharge trucks, and can be incorporated into a rear discharge truck with substantially no modification.

DETAILED DESCRIPTION OF THE PREFERRED EMBODIMENTS

Figure 1:
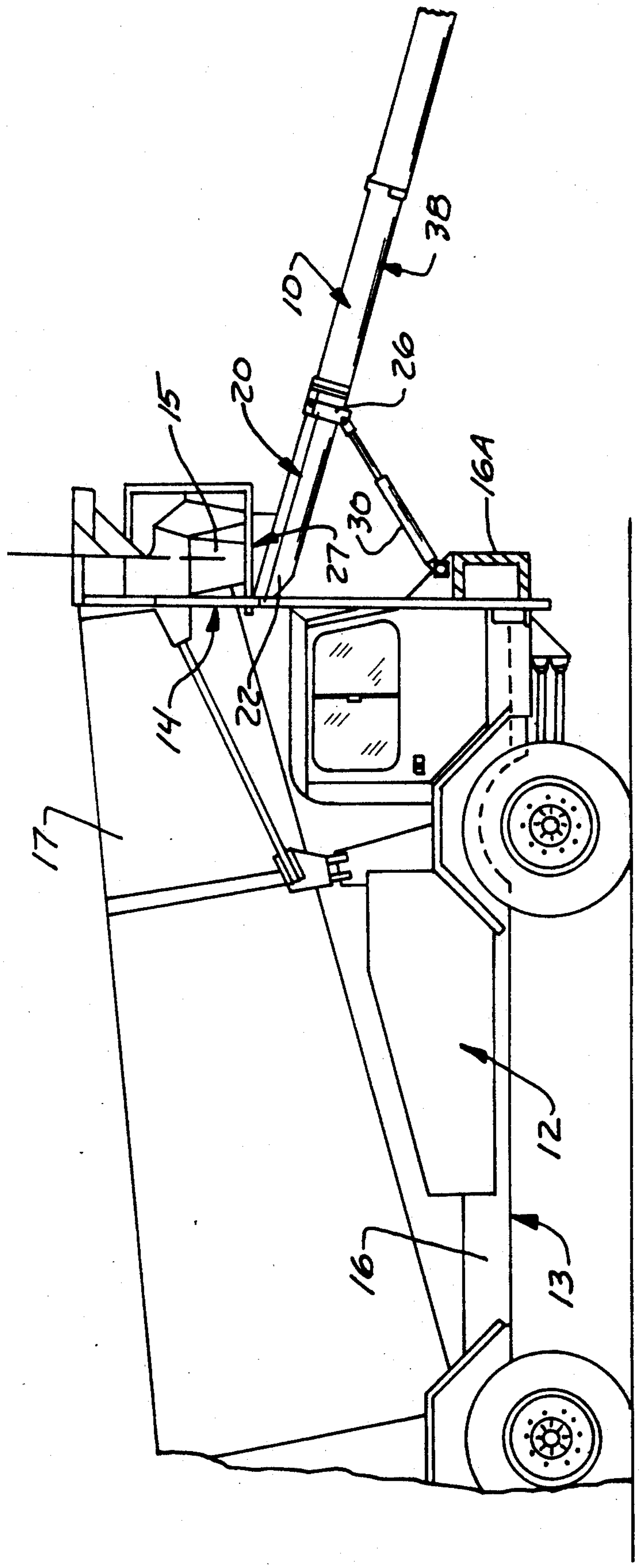
FIG. 1 is a side-elevational view of a front discharge concrete mixer truck including improvements made according to the present invention.

The present invention of a length selective extending discharge chute assembly is illustrated generally in FIG. 1 at 10 and is shown mounted on a concrete mixer vehicle 12. The concrete mixer vehicle 12 has a vehicle frame 13 having an upper frame portion 14 at the forward end and a lower frame 16. A concrete discharge funnel 15 is positioned on upper frame portion 14 for directing materials discharged from a mixer 17 mounted on the frame 13 into a main or first discharge chute section 20 of the chute assembly 10.

Figure 2:
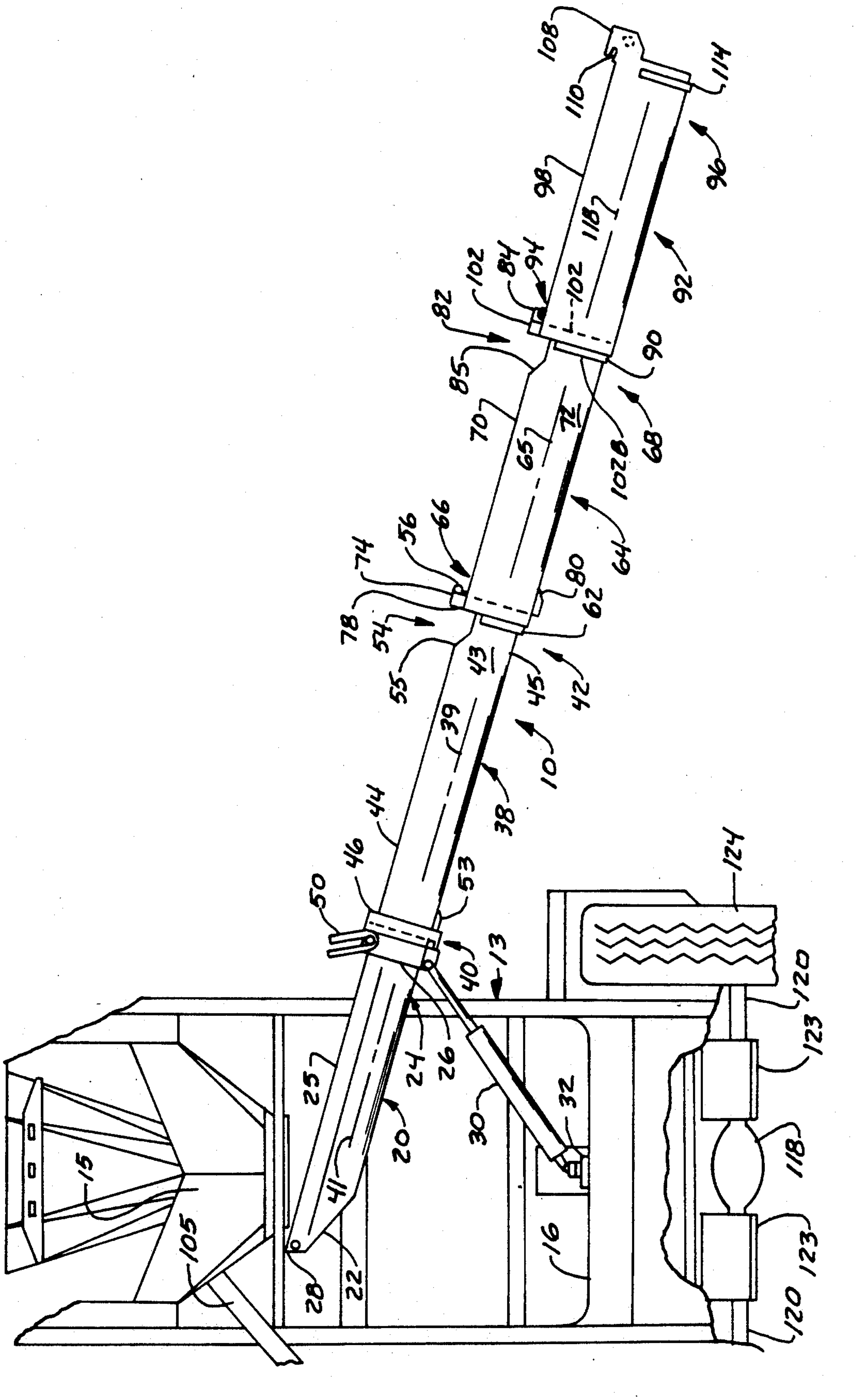
FIG. 2 is a front-elevational view of a front discharge concrete mixer truck shown in FIG. 1, with an extendable and retractable chute made according to the present invention shown in an extended position.
Figure 3:
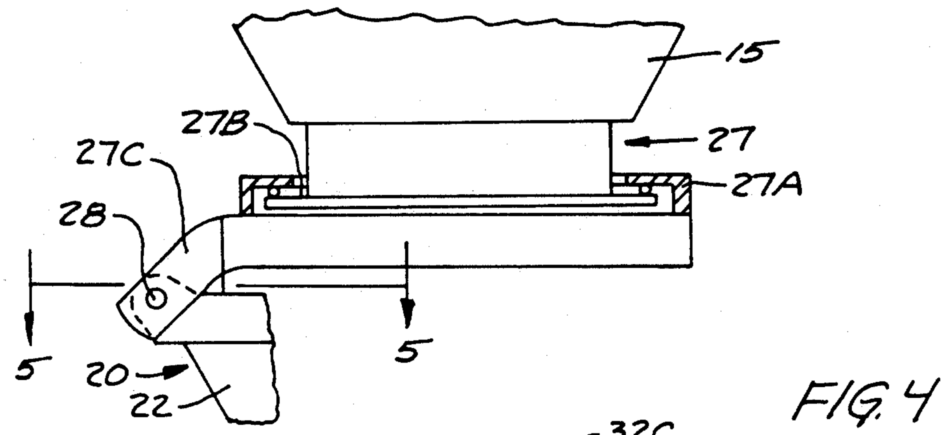
FIG. 3 is a fragmentary sectional view of a typical swivel used for mounting a chute to the discharge end of a mixer truck.
Figure 4:
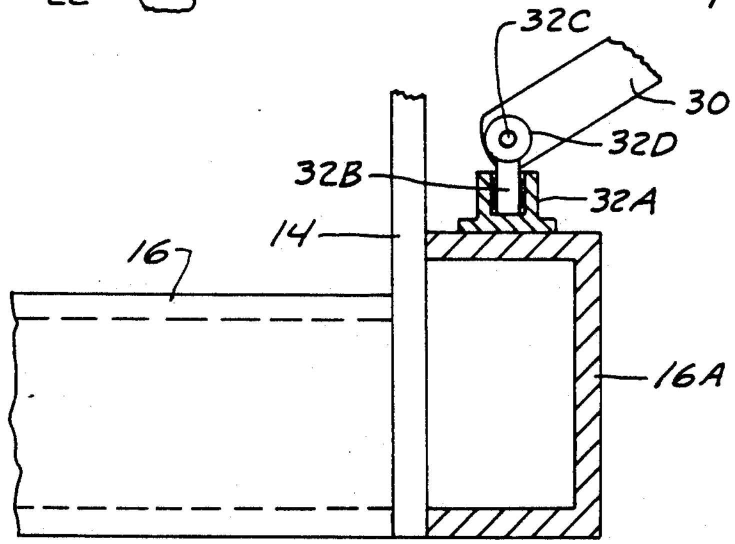
FIG. 4, is a fragmentary sectional view illustrating a mounting swivel for a chute support hydraulic actuator.

Shown in FIG. 2, main chute section 20 has a body of generally U-shaped cross section at its outer end, which has a semi-cylindrical bottom wall, that extends between a hopper end 22 and a discharge end 24 with a pair of spaced apart upper edges 25 extending longitudinally between hopper end 22 and discharge end 24. Hopper end 22 is pivotally mounted beneath discharge funnel 15 with a pivot pin 28 mounted onto a conventional swivel collar 27. As shown in FIGS. 3 and 4, swivel collar 27 has a trolley 27A that runs on suitable rollers on a support flange 27B, that in turn is fixed to the funnel 15 and supported to members of upper frame 14, if desired. The swivel is conventionally used on mixer trucks. In operation, concrete drops through an open center of the swivel into main chute section 20.

Trolley 27A, as stated, pivotally supports the main chute section 20 on pivot pin 28, which passes through ears 27C thereof, and through aligning ears 29. Aligning ears 29 are connected to main or first chute section 20. Hopper end 22 of main chute section 20 is larger under swivel collar 27 than at the discharge end 24. Main chute section 20 tapers to a generally U-shaped trough at its outer or discharge end 24.

Figure 5:
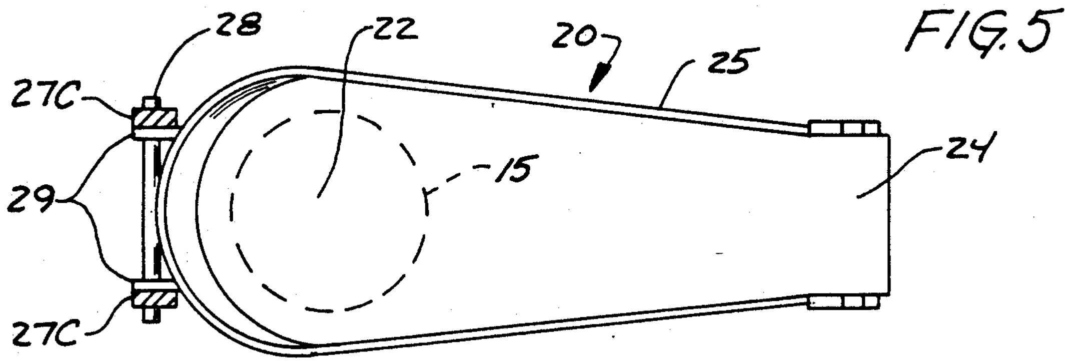
FIG. 5, is a sectional view taken generally along lines 5—5 in FIG. 3.

Referring back to FIG. 2, a reinforcing collar or strip 26 is mounted to discharge end 24 of main chute section 20. Collar 26 and main chute section 20 are supported by a suitable hydraulic piston and cylinder actuator 30 that has its rod end attached to a support ear 26A on collar 26. The base end of actuator 30 is pivotally mounted to the truck frame on a pivotal swivel mount 32. As shown in FIG. 5, pivot mount 32 is secured to a heavy cross member 16A supported on lower frame member 16.

Pivot mount 32 as shown in FIG. 5, permits pivoting of the actuator about an upright axis coincident with the axis of swivel collar 27. Pivot mount 32 comprises an upright socket 32A that pivotally mounts around a pin 32B. Pin 32B is fixed to an eye 32D having an opening for receiving a cross pin 32C for pivotally holding the base of actuator 30 for pivoting about a horizontal axis. Swivel collar 27, cooperating with support flange 27B, together with pivot mount 32, allow main chute section 20 to swivel about a generally vertical axis from side to side, as well as allowing the outer end of the main chute to be raised or lowered.

Hydraulic piston and cylinder actuator 30 is a double acting actuator operated through a suitable valve, and is capable of extension and retraction to cause upward tilting and downward tilting of discharge end 24 relative to hopper end 22 of main chute section 20. Main chute section 20 pivots about pin 28 as the actuator 30 is extended and retracted. Thus, main chute 20 may be swung side to side, or tilted up and down to position discharge end 24 at a desired location radially from discharge funnel 15. When additional discharge chute sections, as described below, are attached in series to main chute section 20 at discharge end 24, material discharged through the discharge funnel 15 in a conventionally manner may be placed at deposit points located away from the vehicle 12.

Figure 7:
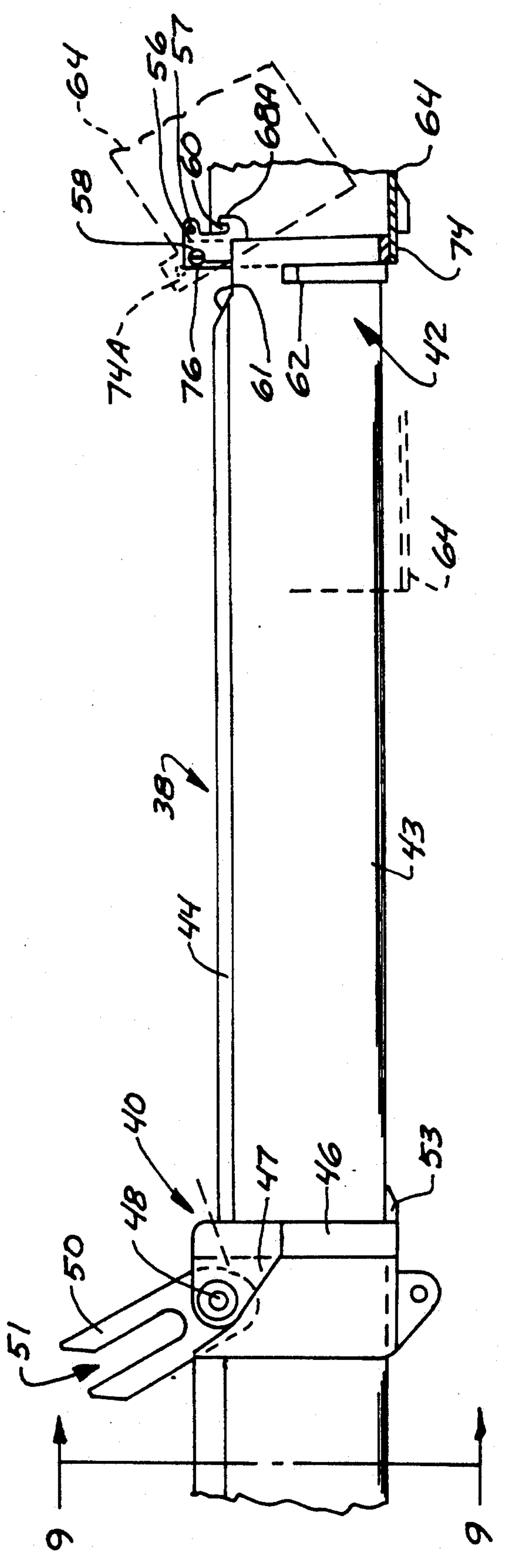
FIG. 7, is a fragmentary side view of the assembly of a second chute section with a main or first chute section, and with a third chute section with parts in section and parts broken away.
Figure 8:
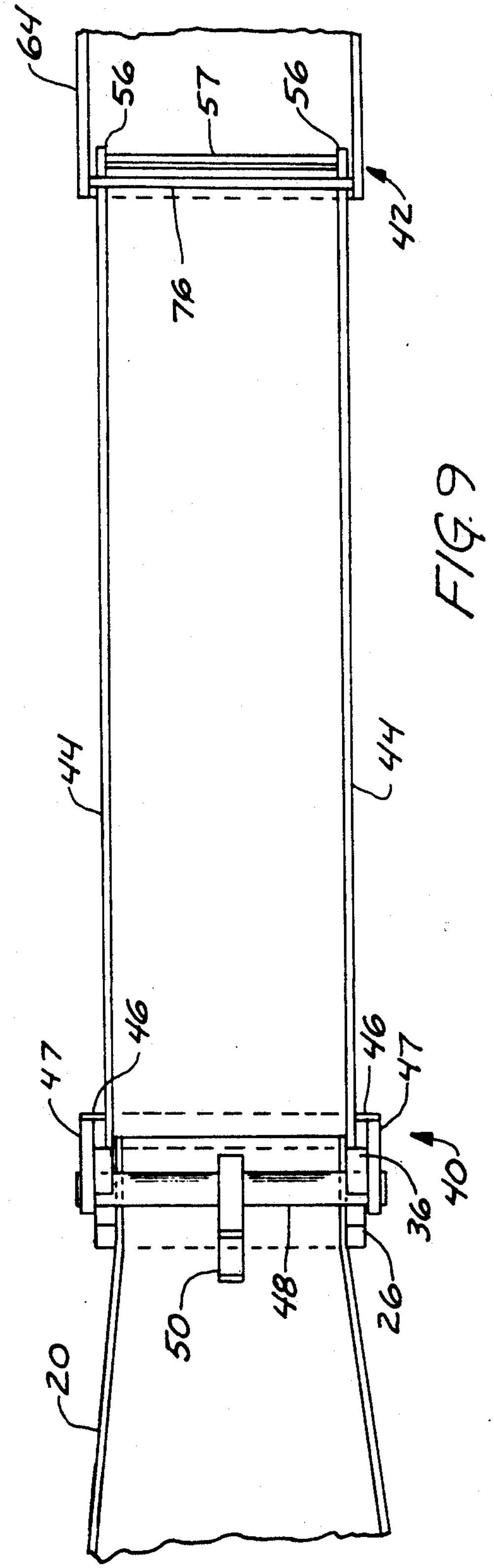
FIG. 8, is a fragmentary top view of the chutes shown in FIG. 7.
Figure 9:
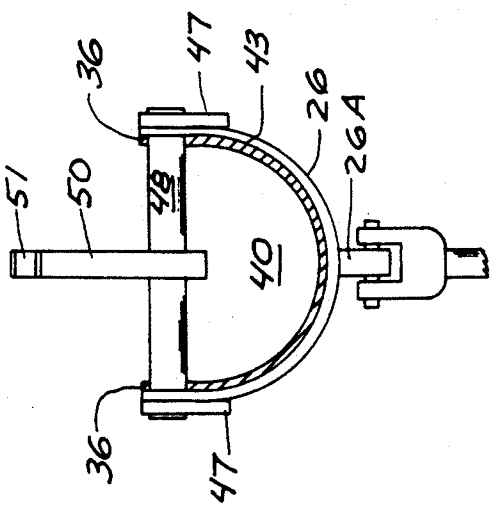
FIG. 9 is a sectional view taken as on line 9—9 in FIG. 8.

Referring back to FIG. 2, and specifically to FIGS. 7, 8 and 9, second extendable chute section 38 is detachably secured to main chute 20 at discharge end 24. Second chute section 38 has a body of generally U-shaped cross section with a semi cylindrical bottom wall (an open topped trough shape) extending between a second chute section inlet end 40 and an outlet end 42 with a pair of spaced, generally parallel upper edges 44 extending longitudinally therebetween. A reinforcing collar 46 is welded to the outside of second chute section 38 at inlet end 40. A pair of ears 47 are welded to the outer sides of the collar 46 and extend from end 40 toward the end 24 of the main chute section 20. A shaft 48 is welded to and extends between the ears 47, as shown in FIGS. 7, 8 and 9.

Figure 19:
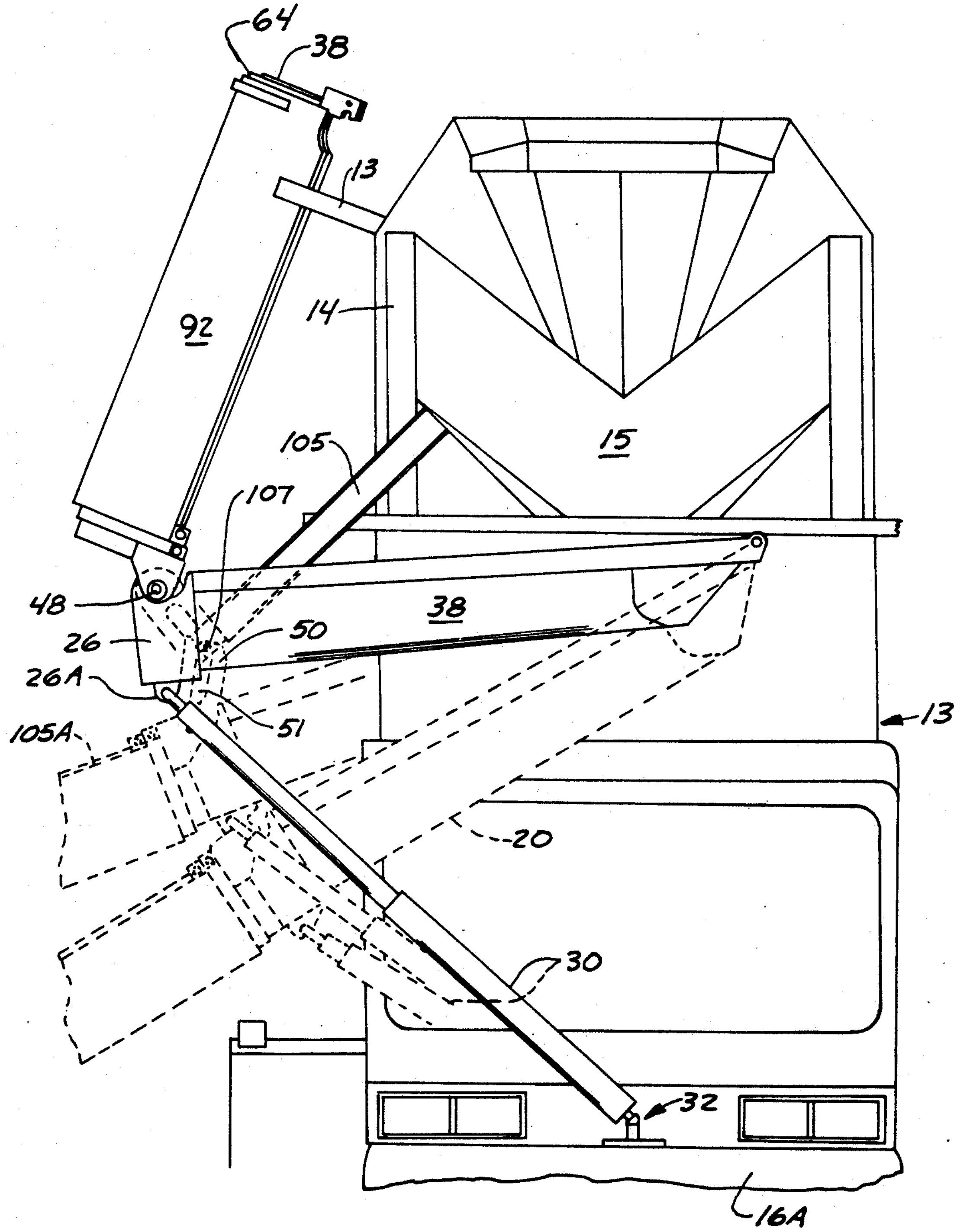
FIG. 19 is a front elevational view schematically illustrating the chute assembly of the present invention being moved to a storage and transportation position.

A clevis shaped actuator arm 50 is fixed on shaft 48 at a midportion thereof and has a pin receiving slot 51 along with a tapered inlet to the slot at its outer end. As shown in FIG. 19 to be described later, pin receiving slot 51 is used for providing a drive to the arm 50 to pivot a retracted chute assembly 10 to a storage position. Thus the arm 50 and shaft 48 are quite rigid and strong.

Figure 6:
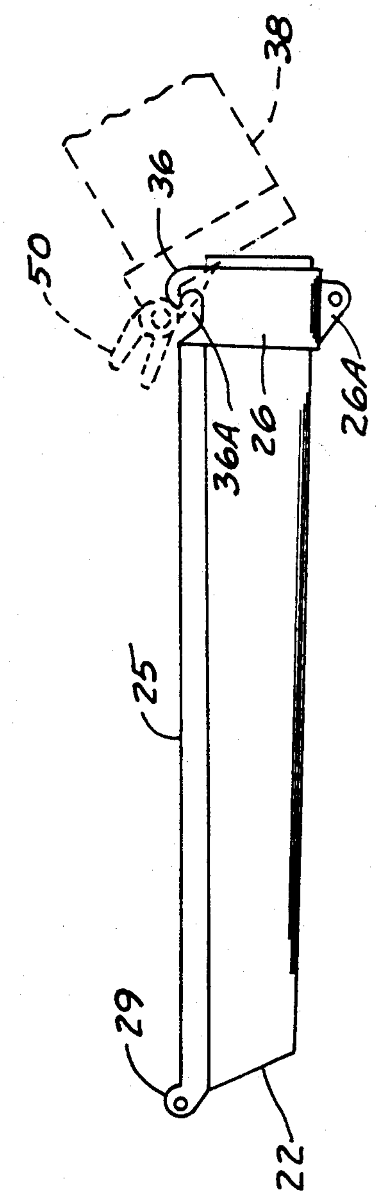
FIG. 6 is a side view of the main or first chute section shown in FIG. 5.

Referring to FIG. 6, a pair of rearwardly opening hooks 36 are formed on the reinforcing collar 26 of main chute section 20 at the upper ends of the collar. The hooks 36 have recess openings 36A that open upwardly, and fit inside ears 47, and over shaft 48 to permit inlet end 40 of second chute section 38 to pivot upwardly and downwardly on the hooks 36. The chute section 38 can be attached to the main chute section by tilting the outlet end 42 upwardly, and dropping shaft 48 into the upwardly opening recesses 36A to the rear of the hooks 36 and slipping the shaft 48 into the hooks. (See FIG. 6 for illustration.) When second chute section 38 is rotated fully downwardly as shaft 48 is seated or retained in the hooks 36, so that the longitudinal axis 39 (FIG. 2) of the second chute section 38 is substantially parallel to a longitudinal axis 41 of main chute section 20, as shown in FIG. 2, collar 46 on first inlet end 40 of second chute section 38 abuts with collar 26 of main chute section 20 forming a seal. A lip at the outer end of chute section 20 overlaps the inlet end 40 of the second chute section. The weight of chute section 38 keeps the chute sections held together.

Referring to FIGS. 2, 7 and 8, second chute section 38 is adapted to support further chute sections for extension and retraction. As shown in FIG. 7, an ear 56 is fixed at each side edge 44 at outlet end 42. The ears 56 have rearwardly facing latch receptacles 58, and forwardly facing latch receptacles 60 near their upper ends. As shown in FIGS. 7 and 8, a rod 57 is welded between the ears 56. Rod 57 prevents the side edges of the second chute section 38 from deforming outwardly and maintains outlet end 40 in a generally U-shaped, semi-cylindrical bottom wall cross section.

Figure 10:
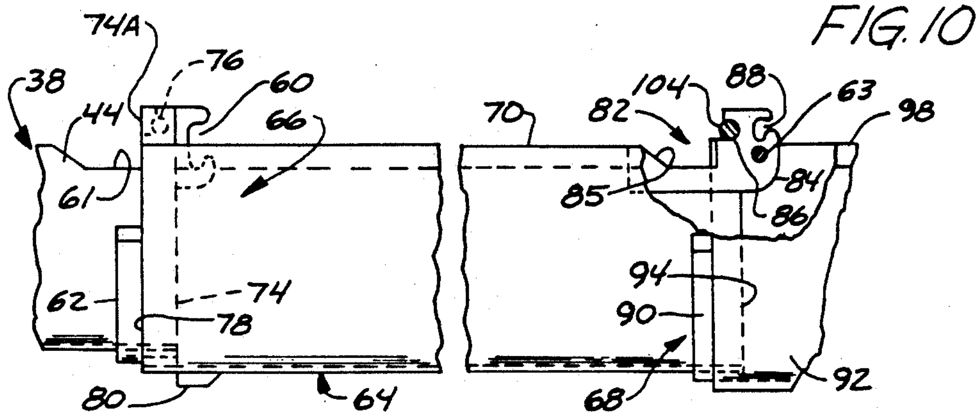
FIG. 10 is a side view of a third chute section and junction areas with the second chute section and a fourth chute section.
Figure 11:
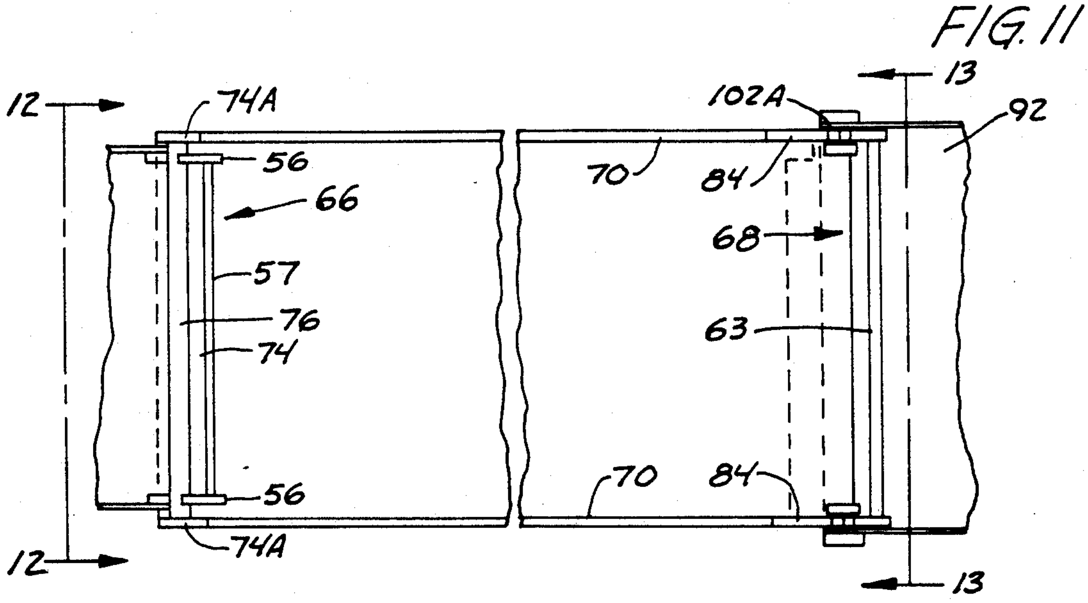
FIG. 11, is a top plan view of the arrangement shown in FIG. 10.
Figure 12:
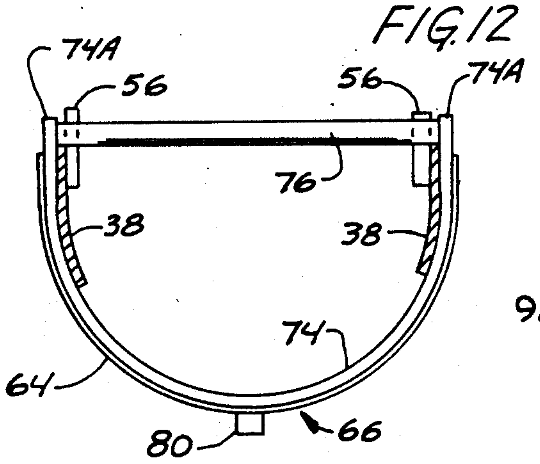
FIG. 12 is a sectional view taken as on line 12—12 in FIG. 11.
Figure 13:
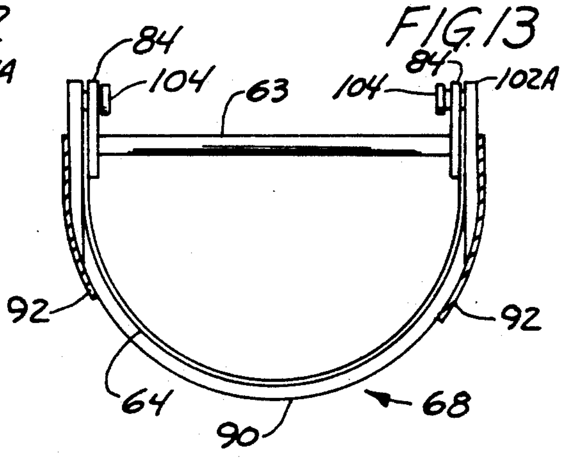
FIG. 13 is a View taken as on line 13—13 in FIG. 11.

Referring to FIGS. 2, 10 and 11, a third chute section 64 is detachably connected to second chute section 38 at outlet end 42. Third chute section 64 has a U-shaped trough body having a generally semi-cylindrical bottom wall extending between an inlet end 66 and an outlet end 68. The trough body of chute section 64 has an inside diameter and width between side walls larger than the outside dimensions of the semi-cylindrical bottom wall and width of the second chute section 38, so it will slide over section 38. Third chute section 64 has parallel upper side walls with a pair of upper edges 70 extending between inlet end 66 and outlet end 68. As shown in FIGS. 10, 11 and 12, a reinforcing bar or strip 74 is welded to an inside surface of the inlet end of 66 of the body of chute section 64, and a rod 76 is welded between the upper ends of the reinforcing bar 74 substantially perpendicular to upper edges 70 and extending across the chute section 64 at a position above edges 70. The upper ends 74A of the reinforcing bar 74 also protrude above the upper edges 70.

As can best be seen in FIG. 7, rod 76 of chute section 64 is made to seat into receptacles 58 of the ears 56 on chute section 38 for securing inlet end 66 of third chute section 64 to outlet end 42 of second chute section 38.

When outlet end 68 of third chute section 64 is tilted upwardly relative to longitudinal axis 39 of chute section 38, as shown in dotted lines in FIG. 7, rod 76 can be passed over the ears 56. Ears 56 fit between the spaced upper ends of the reinforcing strap or bar 74. Inlet end 66 of the chute section 64 can then be lowered so rod 76 fits into the recess 54 and then, when the outlet end of the third chute section 64 is lowered, rod 76 slips into the latch recesses or receptacles 58 and is held therein.

When the outer end of third chute section 64 is rotated fully downward relative to second chute section 38, as seen in FIGS. 2 or 10, the bottom wall of the chute section 64 and reinforcing strap or bar 74 fit below the bottom wall of the chute section 38. An outer edge 78 of reinforcing strap 74 slides under the first outlet end 42 of chute section 38 and contacts a peripheral abutment flange 62 attached (welded) to an outside surface 43 of a metal wall of second chute section 38. The flange 62 is spaced inwardly toward the inlet end from the outlet end edge of chute section 38.

Abutment flange 62 provides a stop for third chute section 64, such that a longitudinal axis 65 of third chute section 64 is held substantially parallel to longitudinal axis 39 of second chute section 38.

Second chute section 64 may be detached from outlet end 42 of chute section 38 by reversing the movement described for installation and rotating the outlet end 68 upward so that edge 78 of inlet end 66 clears the bottom edge of the outlet end 42 of chute section 38. With chute section 64 rotated upward, it can then be pushed in direction indicated by arrow 59 to move rod 76 out of the receptacles 58 into recess 54. When rod 76 is disengaged from the receptacles 58, third chute section 64 may be removed from the second chute section 38, or telescoped rearwardly (inwardly) along the second chute section 38, as will be explained.

Referring back to FIGS. 2 and 10, the outlet end 68 of second chute section 64 also has recesses 82 formed in the top edges of the chute side walls. As best shown in FIG. 10, a pair of ears 84 are fixed at outlet end 68, one along each edge 70, and the recesses 82 are also defined in the ears 84. Each ear 84 has a rearwardly facing latch receptacle 86 formed on a portion of the ears that extends above the upper edges 70.

A fourth chute section 92 is detachably connected to third chute section 64 at outlet end 68. Fourth chute section 92 has a generally U-shaped trough body having a bottom wall of generally semi-cylindrical cross section extending between an inlet end 94 and an outlet end 96, and having an inside diameter and width between parallel upper wall portions larger than the outside diameter and width of the chute section 64.

Figure 15:
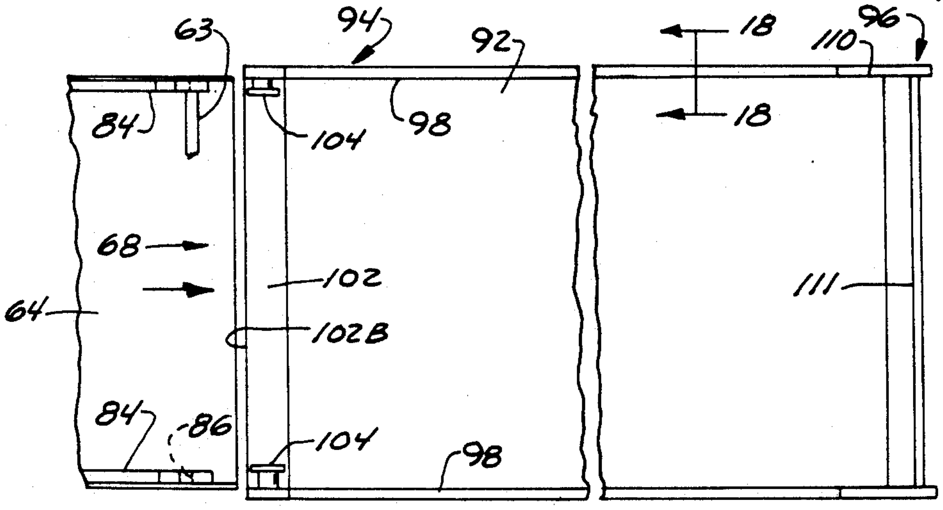
FIG. 15, is a top plan view of the chute section shown in FIG. 14, with the chute sections spaced apart prior to assembly.
Figure 16:
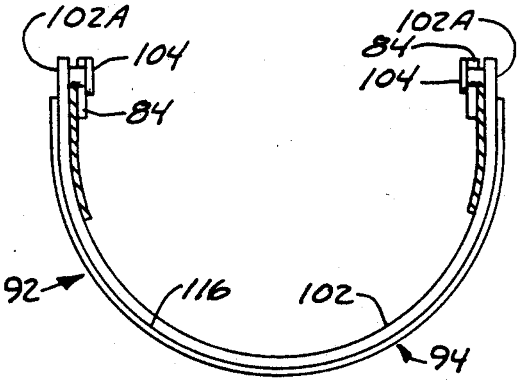
FIG. 16 is a sectional view taken as on line 16—16 in FIG. 14 of an outer end of the fourth chute section.
Figure 17:
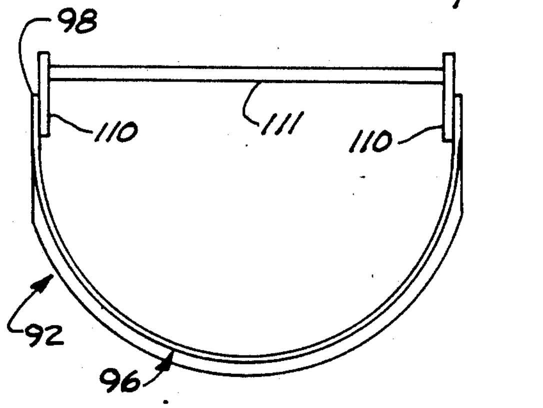
FIG. 17 is an end view of the fourth chute section taken as on line 17—17 in FIG. 14.

Fourth chute section 92 has spaced upper edges 98 extending between the inlet end 94 and outlet end 96. The upper edges are reinforced with a channel section welded to the walls. As shown in FIGS. 15 and 16, a reinforcing strip 102 is welded to an inside surface of the sheet metal trough 92 at inlet end 94 and has ends 102A that extend upwardly from the edges 98. The support ears 102A support short headed pins 104 that extend inwardly toward each other (see FIG. 15). As can best be seen in FIGS. 10 and 16, each pin 104 is made so it can be placed in one of the receptacles 86 of ears 84 of chute section 64.

When the outlet end 96 of chute section 92 is rotated upwardly relative to the axis 65 of chute section 64 a sufficient distance, ends 102A of reinforcing strip 102 can be slipped over ears 84 and pins 104 are slid into recesses 82. The chute section 92 fits outside of the chute section 68, as stated. The shanks of pins 104 are then moved into receptacles 86 where they act as pivot pins for chute section 92. The chute section 92 is locked in place by lowering the outlet end 96 while pins 104 rotate in receptacles 86. The heads on the pins 104 fit to the inside of the ears 84 to latch the pins 104 in place. The space between pins 104 permits this chute section 92 to be retracted to overlap the second and third chute sections, as will be explained.

Figure 2A:
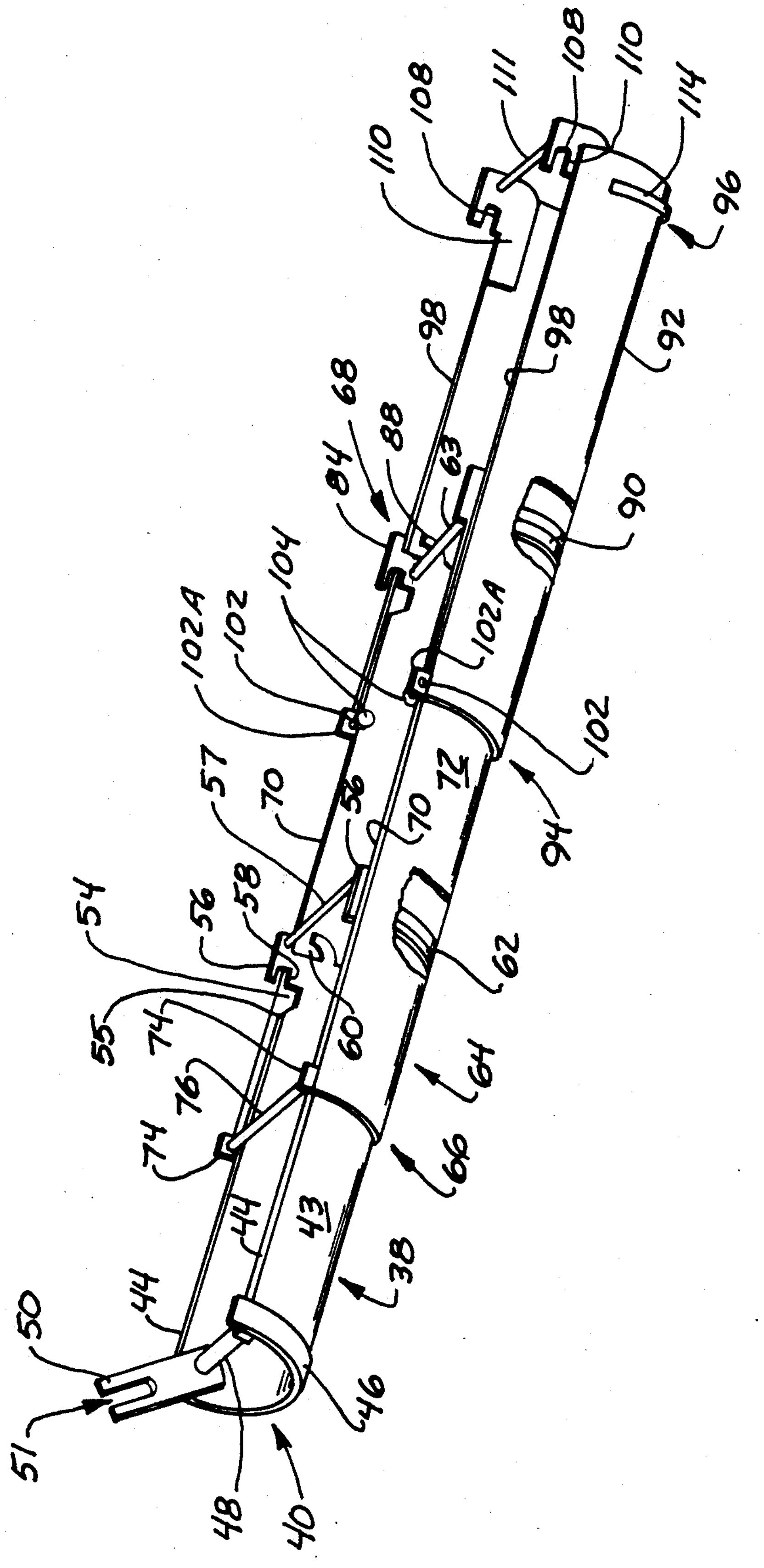
FIG. 2A is a perspective schematic view of the chute assembly of FIG. 2 in an intermediate position.
Figure 14:
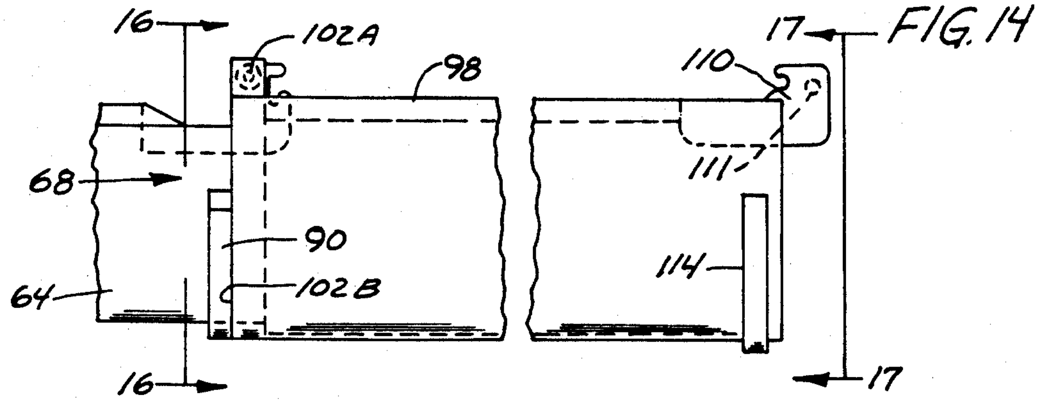
FIG. 14 is a side view of a fourth chute section showing junction with the third chute section.

When fourth chute section 92 is rotated fully downward relative to third chute section 64, the reinforcing strap 102 and bottom wall of the fourth chute section 92 slip outside of the outlet end 68. A peripheral abutment flange 90 is welded to outside surface 72 of chute section 64 and is spaced inwardly from outlet end 68. An edge 102B of reinforcing strap 102 abuts onto abutment flange 90 which is spaced from the outlet end of chute section 64, sufficiently to support fourth chute section 92 such that a longitudinal axis 118 of fourth chute section 92 is held substantially parallel to longitudinal axis 65 of third chute section 64. As shown in FIGS. 2, 2A and 14, fourth chute section 92 also includes chute mounting ears or brackets 110 at its outlet end, and a stop flange or abutment flange 114. The ears 110 have latch notches 108. Ears 110 and flange 114 allow an additional chute section, not shown, to be attached to or removed from outlet end 96 in the manner previously explained. A cross rod 111 extends between the ears 110 to reinforce it and for use as a lock when the chute sections are retracted.

The fourth chute section 92 may be detached from third chute section 64 by reversing the assembly steps described above. Outlet end 96 of chute section 92 is rotated upward so that edge 102B of the reinforcing strip 102 and the end of the bottom wall clear the bottom edge of outlet end 68 of chute section 64. With fourth chute section 92 rotated upward, it then pushed in direction to move pins 104 out of the latch receptacles 86 in ears 84. With pins 104 disengaged from third chute section receptacles 86, fourth chute section 92 can be lifted away from second chute section 64, or can be telescoped inwardly to retract that chute section 92.

Figure 18:
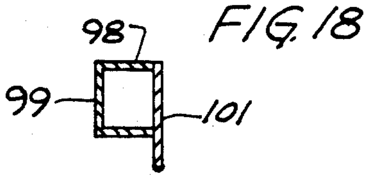
FIG. 18 is a fragmentary sectional view taken on line 18—18 in FIG. 14.

In FIG. 18, a typical showing of the upper edges of the chute section is shown. Fourth chute section 92 has upper edges 98 that are reinforced with a channel-shaped bar 99 that is welded to the upper portion of the sheet metal wall 101 and extends along the longitudinal edge of the chute section between the ears at the inlet and outlet end. The placement of reinforcing members can be accomplished as desired.

Third chute section 64 and fourth chute section 92 may slide or telescope relative to each other and relative to second chute section 38. To accomplish such movement, pins 104 are disengaged from receptacles 86 as described above. The pins 104 are permitted to drop into recesses 82 and rest in notches 82. The fourth chute section 92 is thus lowered relative to chute section 64 and when the outer end of chute section 92 is rotated back to orient longitudinal axis 118 substantially parallel to longitudinal axis 65, an inner surface of reinforcing strap 102 and the bottom of chute section 92 are lowered sufficiently to slide over abutment flange 90. Then pushing fourth chute section 92 toward the main chute section causes pins 104 to slide over tapered edges 85 so the chute section 92 can be retracted fully onto chute section 64.

As shown in FIG. 2A, fourth chute section 92 slides over outside surface 72 of third chute section 64. Pins 104 are slidable along upper edges 70. Fourth chute section 92 may then be moved toward inlet end 66 of third chute section 64. The inner surface of fourth chute section 92 makes contact with and slides onto a raised tapered strip r lug 80 on outer surface 72 of chute section 64 as shown in FIGS. 2 and 10. In this position, tapered strip 80 maintains a separating force on the inner surface of fourth chute section 92. Rod 111, which extends between ears 110 at outlet end 96 enters the latch receptacles 88 of ears 84, and is held there until manually released to maintain fourth chute section 92 in a retracted position in registry with third chute section 64.

With the retraction of fourth chute section 92 onto third chute section 64, this combined retracted chute assembly can be further retracted onto second chute section 38. To do so, rod 76 at inlet end 66 of chute 64 is disengaged from its mounted position by tilting the outer end of chute section 64 (and retracted chute section 92) upwardly as described above. Rod 76 is lowered into notch or recess 61 of each ear 56, and third chute section 64 and retracted fourth chute section 92 are then tilted back down to orient longitudinal axis 65 of chute section 64 substantially parallel to longitudinal axis 39 of second chute section 38. In this position, (with rod 76 dropped into notch 61) an inner surface of chute section 64 clears abutment flange 62 to allow chute section 64 to slide over abutment flange 62. Subsequent pushing of the chute section 64 in direction 59 slides the chute sections 64 and 92 toward inlet end 40 of chute section 38. A partially retracted position is shown in FIG. 2A. In FIG. 2A, chute sections 38 and 64 are shown in a telescopically slidable position, wherein an inside surface of chute section 64 is positioned around outside surface 43 of chute section 38. Rod 76 is slidable along upper edges 44 to aid in telescopically sliding the chute sections for retracting. The chute sections 64 and 92 are moved toward inlet end 40 so that an inner surface of third chute section 64 makes contact with and slides onto tapered lug 53 shown in FIG. 2.

Raised tapered lug 53 holds the inner surface of third chute section 64 downwardly and rod 63, which is fixed to ears 84 and spans the top of the chute section enters recesses 60 at the outlet end of chute section 38 and engages latch receptacles 68A to maintain chute sections 38 and 64, and also, thus, chute section 92, in a retracted position.

With retraction of the fourth chute section 92 onto third chute section 64 and the combination of both chute sections 64 and 92 onto the second chute section 38, this compacted chute assembly can be rotated to the curb side of the vehicle 12 to a location where lever or arm 50 aligns vertically with a fixed actuator strut 105, (see FIG. 19) which is fixed to and securely braced to upper frame 14. The three chute sections 38, 64, and 92, which have been nested together and latched in a retracted position can be folded to a storage and transport position by operating actuator 30. After aligning lever or arm 50 with strut 105, the entire chute assembly, including the main or first chute section 20 is moved upwardly so that the clevis opening or slot in arm 50 aligns with a pin 107 on strut 105. Pin 107 is mounted in a pair of side members so that the slot 51 in arm 50 will slide up onto the pin as the hydraulic actuator 30 is extended.

Referring to FIG 19, it can be seen in the dotted line positions that the retracted actuator 30 inclines the main chute section 20 a substantial amount, and in the mid position, indicated at 105A, the main chute section has been pivoted so the slot 50 in arm 51 is just in position to receive pin 107. Upon further extension of the actuator, the arm 50 retains pin 107. Strut 105 is fixed and as the chute assembly is raised further, a torque is created on shaft 48 to pivot the retracted chute sections 38, 64 and 92 in a clock wise direction as seen in FIG. 19 as the main chute section is moved upwardly. The force for pivoting is transferred through shaft 48, ears 49 and the supports to the chute section 38. When the unit reaches a storage position as shown in solid lines in FIG. 19, a fixed bracket 134 of any suitable design guides and holds the nested chute assembly as it is in its storage position.

Of course, removal of the storage chute assembly from this storage position can be accomplished by merely reversing the movement of the actuator 30, which is a double acting hydraulic actuator.

When the extending chute is being used, the height of the inlet to the main chute section is important in order to have adequate slope for flow of concrete through the chute to its outer discharge end. Also, most underpasses and bridges on roadways have a fairly standard height that trucks can not exceed. In front discharge trucks, in particular, it is desirable to have some additional height over the transport height for discharging concrete through the extending the chutes. In order to provide increased height for discharge, the present vehicle has expandable air springs for mounting the vehicle body relative to the front axle. The air springs permit raising the vehicle body relative to the front axle, and thus relative to support tires when desired for obtaining additional height at the discharge end of the mixer.

Referring specifically to FIGS. 20, 21, 22, 23 and 24, vehicle frame 16 has several longitudinal main frame members, that comprise longitudinal stringers 116. A differential drive for a front wheel drive is shown essentially at 118 in FIG. 2. This has axle housings indicated at schematically 120 extending laterally out from opposite sides, and each of the axle housings is clamped securely with suitable clamps 122 to support platforms 123. The steering gear connections, and other pivot joints for steering to the front wheels 124 are conventional in design.

Separate spring mounting platform 123 is clamped securely with the clamps 122 to each of the axle housings 120 that extend laterally from the central drive. Spring mounting platforms 123 are shown in top plan view of FIG. 22, and included base plate 128, and an upright flange 129. The platforms 123 are made to fit with the fenders, and are mounted back to the main frame members 116 through a pair parallel links 130, 130. Parallel links 130 have very rigid pivoting ends 132, 132 which are attached at vertically spaced positions to the flange 129, through suitable brackets 134 and the opposite ends of the parallel links 130, 130, on each side of the vehicle are attached through very rigid pivoting connections 136, 136 to a front face of a depending bracket 138 that is braced back to the main frame members 116 in a suitable manner.

Parallel links 130,130 maintain the orientation of the bottom plate 128 as the bottom plate may move up and down relative to the frame 16. There will be a slight change in fore and aft position of the axle due to the arcuate movement of the parallel links 130, 130. The links 130, 130 are selected in size and strength to carry the necessary loads encountered by the front axle of a mixer truck.

Figure 20:
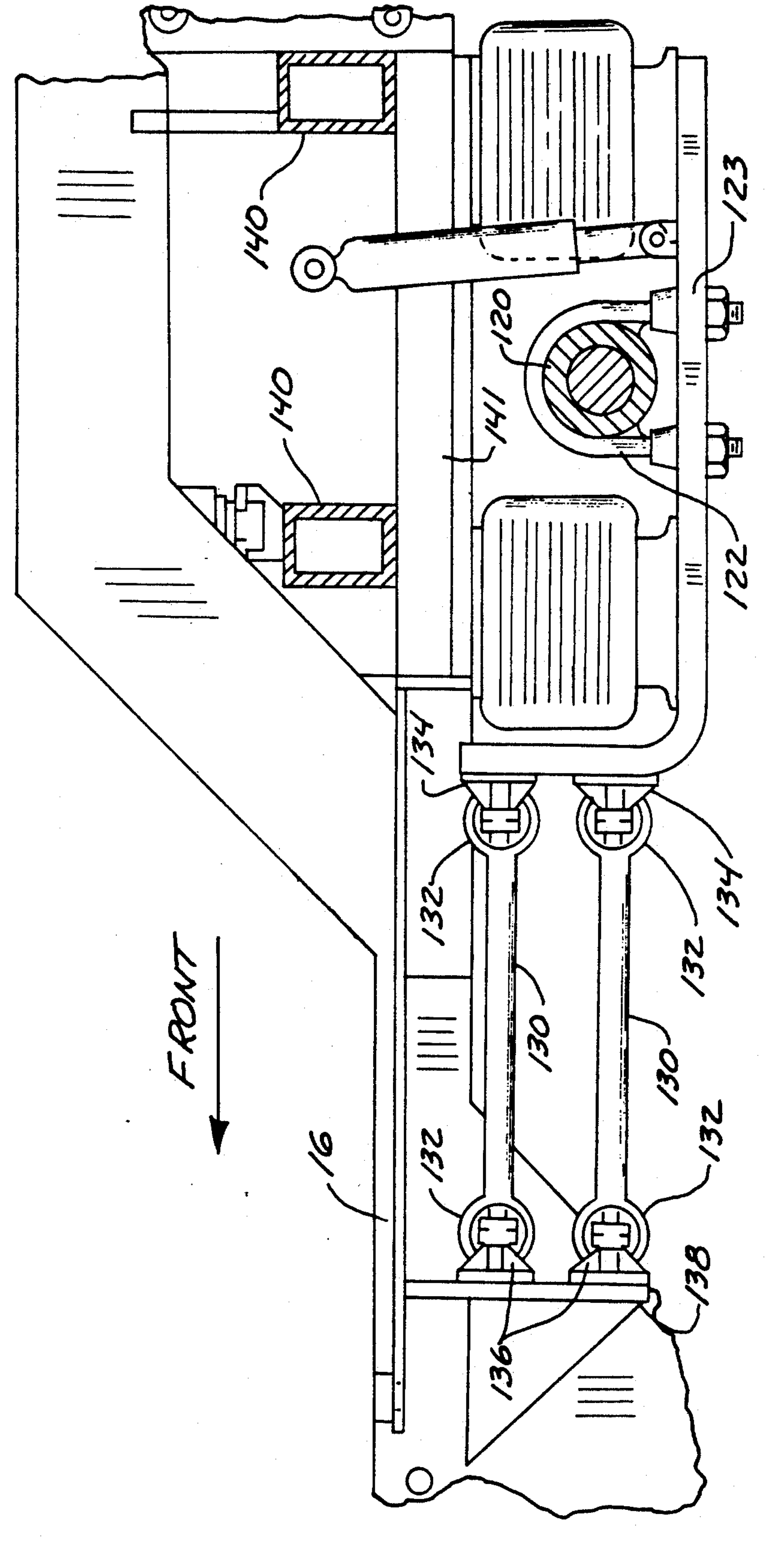
FIG. 20 is a part schematic side representation of an air bag support system for raising and lowering the front portions of a mixer truck having a chute installation according to the present invention from a side opposite FIG. 1.
Figure 21:
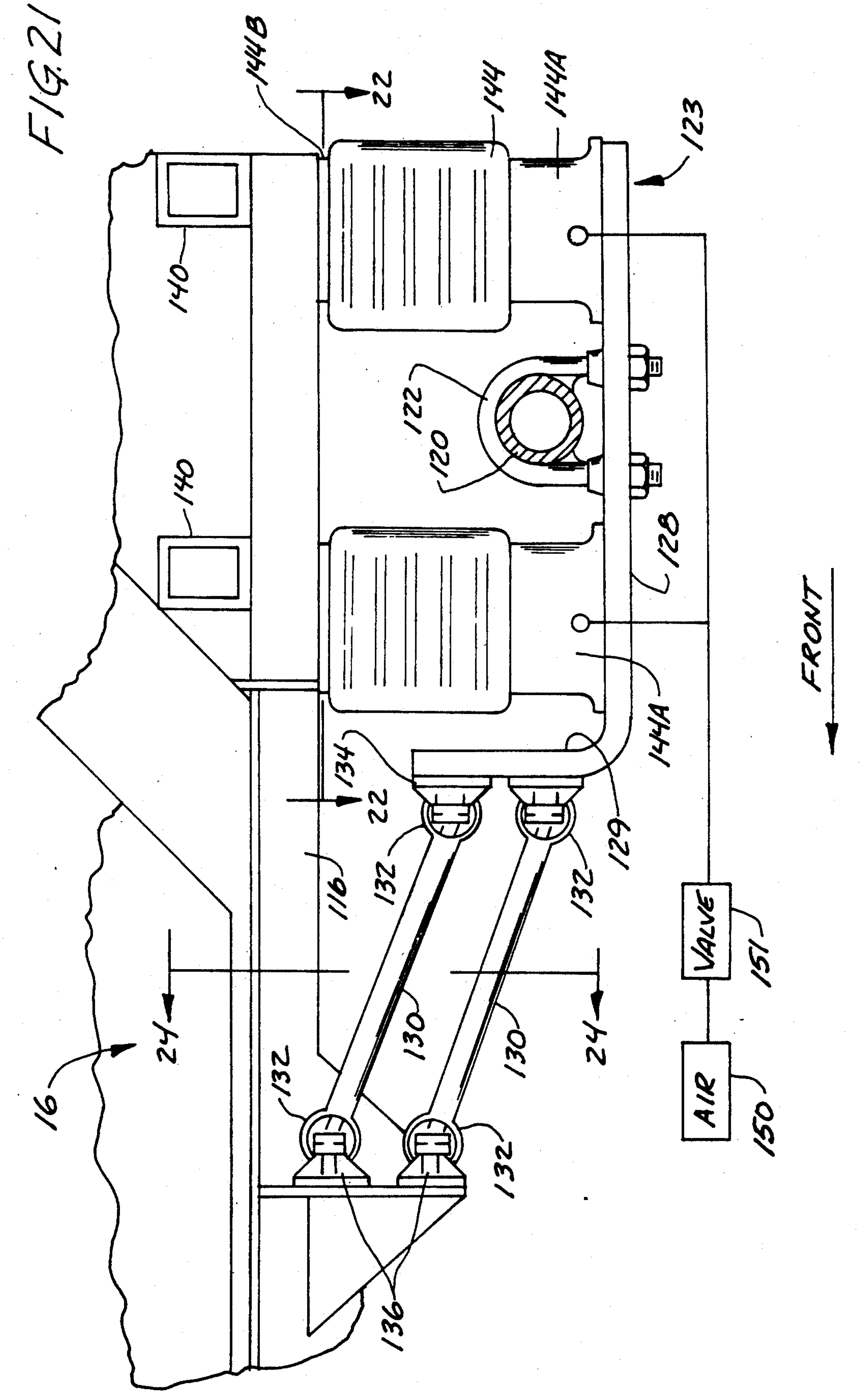
FIG. 21 is a schematic side representation of the air bag support for the front axle of FIG. 22 in an extended (front end raised) position.
Figure 22:
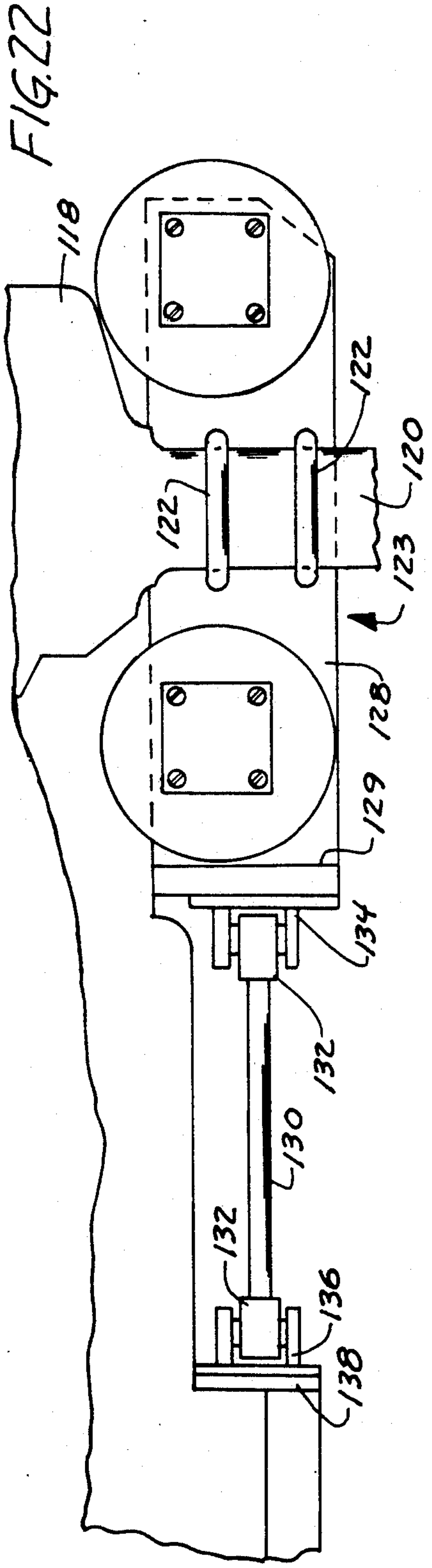
FIG. 22 is a fragmentary section view of the one side of the axle made according to the present invention and taken as on line 22—22 in FIG. 21.
Figure 23:
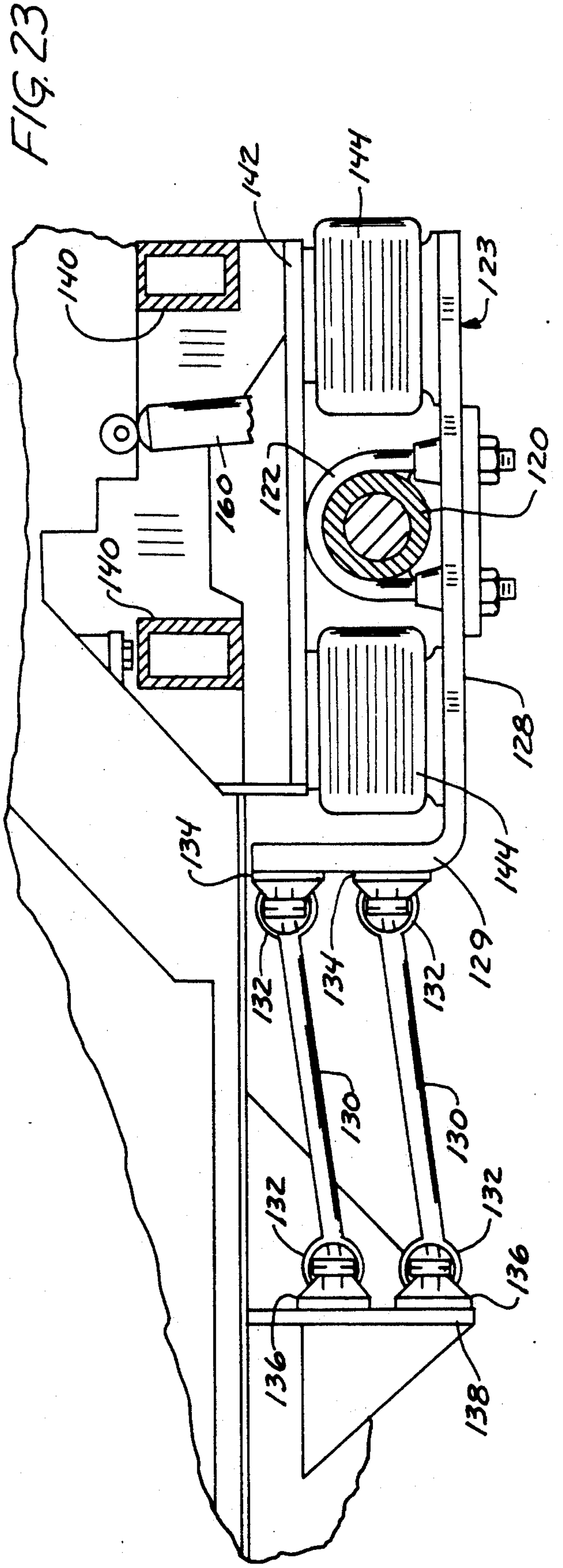
FIG. 23 is a schematic side view of the airbag support in a collapsed position.
Figure 24:
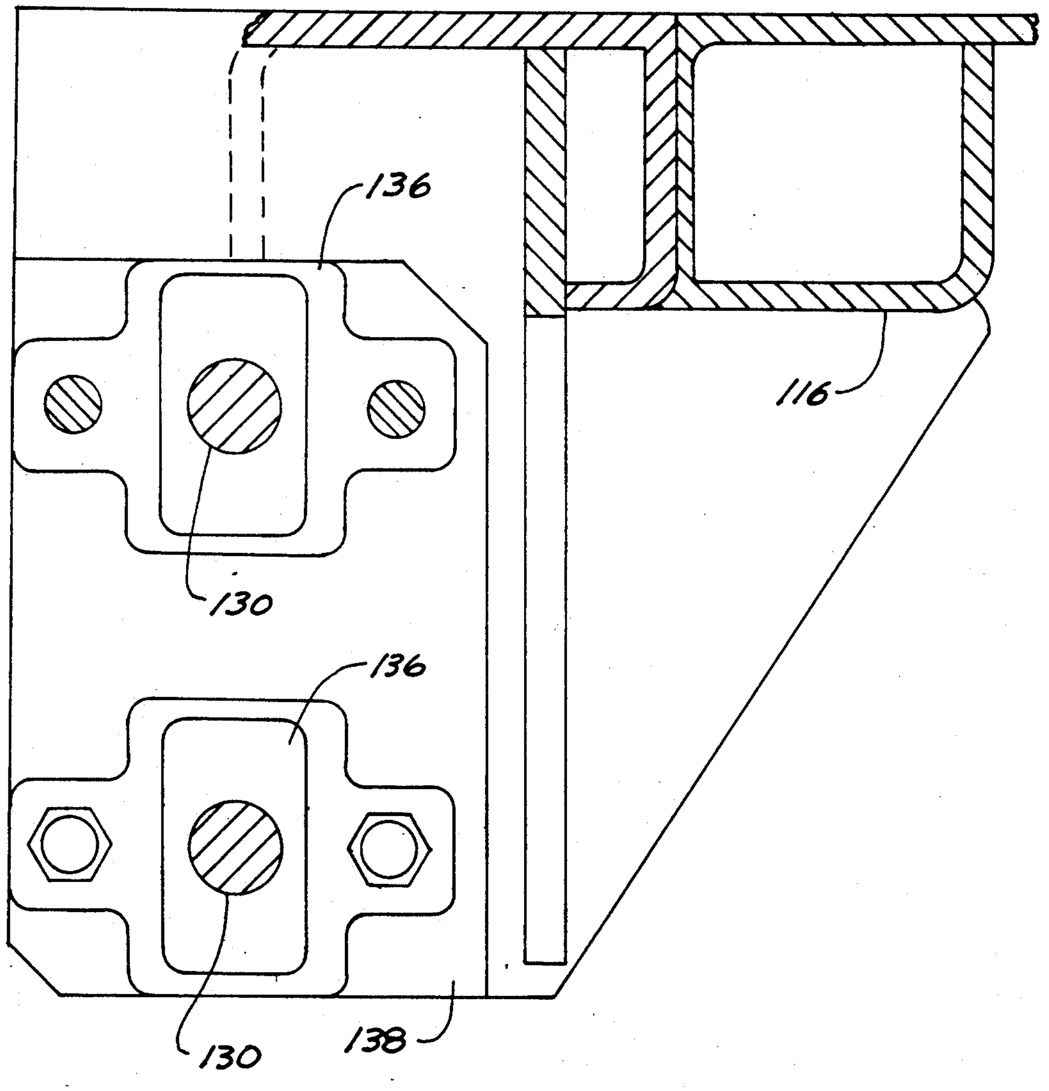
FIG. 24 is a fragmentary sectional view taken as on line 24—24 FIG. 21.

Frame 16 includes a number of suitable cross-members shown at 140, 140 for example, which in turn carry a spring reaction member 142. This can be any suitable type of member, but is made so that a pair of air bag springs of conventional design indicated at 144, can be mounted between the spring support plate 123, and the reaction member 142 to support the weight of the frame and vehicle 12 relative to the axle housings 120 through the spring support plate 123. In FIG. 20, air springs 144 are shown in a mid position with the parallel links 130, 130 generally horizontal. In FIG. 21, the maximum extended position of air springs 144 is illustrated to show that frame assembly 16 and the fore and aft frames 116 are displaced, thus the front end of the mixer truck is raised to increase the height of chute assembly 10. The axle 120 travels approximately seven inches from its normal centered position as shown in FIG. 20 to its extended position in FIG. 21, which gives an additional seven inches of height of chute assembly 10.

The springs have telescopic base members 144A that attach to platform 128 and top plates 144B that attach to the frame 16. Again, the springs are conventional air bag springs.

Air springs 144 are operated from a suitable air supply 150, through control valves 151 to provide air under pressure to the air springs. Air springs 144 can be of conventional design as known for mounting rear axles of vehicles, and springs 144 themselves are expandable and collapsible bellows that have suitable attachment plates 154 and suitable attachment column 156 for connecting to the action member 142 and the spring support plate respectively.

Springs 144 operate in a normal manner. Axle travel can be dampened through suitable shock absorbers indicated at 160, if desired coil helper springs can be utilized for supporting weight. The axles are guided through an amount of movement reliably, and when at work site, the increased height permits greater extension of the chute for depositing concrete in more remote area.

The extension of the chute sections is easily done once they are unfolded. The chute sections easily slide and lock in place. They can be extended as needed, once the individual sections are unlatched and swing from side to side easily.

Two or more telescoping chute sections, such as those shown in FIG. 2A, can be connected directly to a swivel or hopper. The hopper bottom or similar material guide can be considered a discharge chute section as well.

Although the present invention has been described with reference to preferred embodiments, workers skilled in the art will recognize that changes may be made in form and detail without departing from the spirit and scope of the invention.

What is claimed is:

1. A discharge chute assembly for discharging material from a discharge apparatus having a storage reservoir, the discharge chute assembly comprising a first discharge chute section for receiving the material from the reservoir:

a second chute section comprising a trough-shaped body extending longitudinally between a second inlet end and a second outlet end and having spaced upper edges, means to couple the inlet end to the first chute section to receive materials from the first chute section;

a third chute section comprising a body of complemental cross-sectional shapes to the second chute section and being of larger size so as to telescopically slide over the second chute section and moveable to extend outwardly from the second chute section and having a pair of edges extending longitudinally between a third inlet end and a third outlet end; and fastening means connecting the third inlet end to the second outlet end for pivotable movement of the third chute section with respect to the second chute section, and permitting detachably disconnecting the third inlet end from the second outlet end for telescopically sliding movement of the third chute section relative to the second chute section.

2. The chute assembly of claim 1 wherein the fastening means comprises a pair of receiving brackets mounted to the second outlet end and a rod mounted to the third inlet end and extending between respective edges of the third chute section, the rod engaging the receiving brackets for providing the pivotable movement of the third chute section and being disengageable from the receiving brackets and slidable over the edges of the second chute section for telescopic sliding movement of the second chute section.

3. The chute assembly of claim 2 and a second latch portion on the fastening means, the second latch portion securing the third outlet end of the third chute section to the second chute section after telescopic retraction of the third chute section onto the second chute section.

4. The discharge chute assembly of claim 3 wherein said third chute section has a pair of ears on the sides thereof at the third outlet end, said ears having latch receptacles on the side that faces the inlet end of said third chute section, and a fourth chute section having a shape complemental to the third and second chute sections, and of larger size than the third chute section so it will slide over the third chute section, said fourth chute section having a fourth inlet end and a fourth outlet end longitudinally spaced apart, a pair of pins attached to said fourth chute section adjacent the fourth inlet end and being adapted to be mounted in the latch receptacles on the ears at the third outlet end for pivotally mounting the fourth chute section relative to the third chute section about a generally horizontal pivot, and means to prevent the fourth outlet end from pivoting downwardly relative to the pivot axis formed by the pins at the fourth inlet end beyond a position substantially axially aligned with the third chute section.

5. The chute assembly of claim 4 wherein said fastening means comprises a pair of brackets that extend upwardly above the upper edges of the second chute section, and wherein the rod is mounted in receptacles on the brackets at a position above the upper edges of the second chute section, said rod being removable to engage the upper edges of the second chute section so that the bottom of the third chute section is spaced downwardly from the bottom of the second chute section as the rod moves along the upper edges of the second chute section.

6. The chute assembly of claim 5 and latch means cooperating between the brackets on the outlet end of the third chute section and the outlet end of the fourth chute sections so that when the fourth chute section is retracted to overlie the third chute section, the latch means holds the fourth chute section in such retracted position.

7. The chute assembly of claim 1 wherein said first discharge chute section is mounted for swiveling movement about a generally upright axis relative to the storage reservoir.

8. The discharge chute assembly of claim 7 wherein said storage reservoir comprises a mobile cement mixer on a truck.

9. The discharge chute assembly of claim 1 wherein said second chute section is pivotally mounted to said first discharge chute section about a generally horizontal pivot, and powered means to pivot said second chute section about said horizontal pivot to permit lifting and lowering outlet ends of the second chute section and the third chute section.

10. The discharge chute assembly of claim 9 and a lever arm connected to said second chute section adjacent the inlet end thereof, said lever arm being fixed to said second chute section, and means for lifting the first discharge chute section so that the portion thereof coupled to the inlet end of the second chute section is raised, a fixed actuator mounted on said discharge apparatus and positioned to engage said lever in at least one position in which the discharge chute assembly can be placed,said lever extending upwardly from said discharge chute assembly and upon engaging said actuator by operating the means for lifting causing torque to be applied to the pivots of the second chute section to thereby pivot the second chute section outlet end upwardly to a folded position.

11. A vehicle having a frame and wheeled front and rear support axles supporting the frame, a storage body mounted on the frame and which includes an outlet means for discharging stored material into an extendable discharge chute for transporting the material to be discharged to a remote location;

said outlet being located horizontally adjacent to and above the front axle of the vehicle, and linkage means and fluid pressure extendable and retractable spring means connected between the axle of the vehicle and the frame, and including selectively operable means to extend said fluid pressure spring means to raise the frame and the storage body relative to the front axle whereby the gravity flow of material to be discharged from the storage body through the chute is enhanced and the distance of the material discharged is increased.

12. The mixer truck of claim 11 including vertically spaced parallel arm means having first ends connected to the frame and second ends connected to the front axle for supporting the front axle relative to the frame for generally vertical movement of the frame under control of the fluid pressure spring means.

13. The mixer truck of claim 11 wherein the fluid pressure spring means are mounted on a support that is bolted to the axle of the vehicle, and wherein the fluid pressure spring means comprise airbags that are attached to the frame, whereby upon changing the fluid pressure in the fluid pressure spring means, distance between the axle and the frame is changed.

14. The mixer truck of claim 11 wherein the storage body is a front discharge concrete mixer, and said fluid pressure spring means comprise airbags mounted between the front axle of the vehicle and portions of the frame.

15. A telescopic chute assembly for conveying materials discharged from a reservoir comprising:

a first chute having a body of generally U-shaped cross section with a pair of edges extending longitudinally between an inlet end and an outlet end and having means for mounting the first chute to a reservoir;

a second chute having a body of generally U-shaped cross section with a size larger than the first chute and extending longitudinally between an inlet end and an outlet end;

fastening means having a pair of receiving brackets mounted at the outlet end on respective edges of the first chute and a pair of mating supports mounted on respective edges at the inlet end of the second chute being supported by and slidable along the edges of the first chute permitting telescopically slidable movement of the second chute longitudinally relative to the first chute to extend from the first chute and to retract at least partially over the first chute, and the mating supports being detachably and pivotally mountable to the receiving brackets to permit securing the inlet end of the second chute to the outlet end of the first chute and releasing the second chute from the first chute.

16. The chute assembly of claim 15 and further including:

an abutment flange formed on an outside surface of the first chute adjacent to the outlet end for receiving contact from an edge of the inlet end of the second chute to prevent the second chute from slidably moving longitudinally relative to the first chute when the mating supports of the second chute are engaging the receiving brackets of the first chute.

17. The chute assembly of claim 15 and further including:

a raised taper strip formed on an outer surface of the first chute adjacent to the inlet end for maintaining a space between the outer surface of the first chute and the inner surface of the second chute when the second chute is retracted over the first chute.

18. The chute assembly of claim 15 wherein the inlet end of the second chute further includes:

a strap having a generally semi-circular cross section mounted on an edge of the inlet end having the ears mounted thereon.

19. The chute assembly of claim 15 and further including:

a third chute having a body of generally semicircular cross section with a diameter larger than the second chute and with a pair of edges extending longitudinally between an inlet end and an outlet end, and a second pair of mating supports mounted at the inlet end on the respective edges of the third chute being supportable by and slidable along the second chute permitting telescopically slidable movement of the third chute longitudinally relative to the second chute, and the second pair of mating supports being detachably mountable to a pair of receiving brackets mounted at the outlet end on respective edges of the second chute to permit securing the inlet end of the third chute to the outlet end of the second chute and releasing the third chute from the second chute.

20. A chute assembly mounted to a main chute on a concrete mixer vehicle frame comprising:

a first chute mounted to the main chute and having a body with a lower portion in a generally semi-circular cross section with a pair of edges extending longitudinally between an inlet end and an outlet end;

a second chute having a body with a lower portion in a generally semi-circular cross section with a diameter larger than the first chute and with a pair of edges extending longitudinally between an inlet end and an outlet end;

fastening means having a pair of hook means mounted at the outlet end on respective edges of the first chute and a pair of ears mounted at the inlet end on respective edges of the second chute being supported by and slidable over the edges of the first chute permitting telescopically slidable movement of the second chute longitudinally relative to the first chute, and the ears being detachably mountable to the hook means to permit securing the inlet end of the second chute to the outlet end of the first chute releasing the second chute from the first chute; and lift means having a selectively distensible body generally supporting the vehicle frame for raising and lowering the vehicle frame to selectively change vertical height of the main chute.

* * * * *